Sept. 28, 1948.　　　W. G. TOLAND　　　2,450,100
WHEEL CONSTRUCTION
Filed Sept. 21, 1946
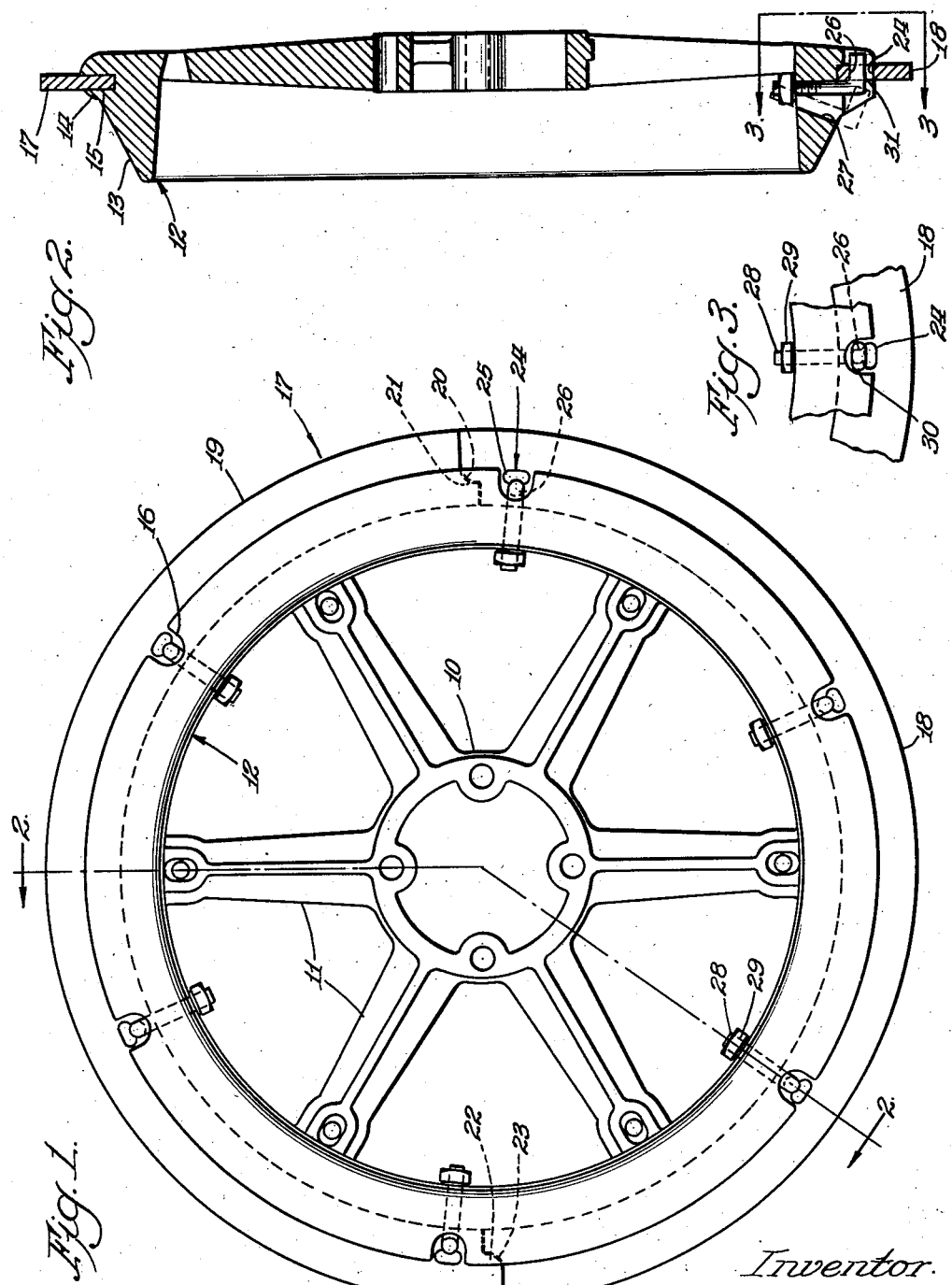
Inventor.
Wayne G. Toland Patented Sept. 28, 1948

2,450,100

UNITED STATES PATENT OFFICE 2,450,100

WHEEL CONSTRUCTION

Wayne G. Toland, Canton, Ill., assignor to International Harvester Company, a corporation of New Jersey Application September 21, 1946, Serial No. 698,524

7 Claims. (Cl. 301—87)

This invention relates to agricultural machines, and particularly to supporting wheels therefor. More specifically the invention concerns a replaceable skid ring for furrow wheels and the like.

In a disc plow the furrow wheel travels at an angle to the vertical and is provided with a tire portion generally V-shaped in cross section, the apex forming a narrow peripheral portion adapted to dig into the ground at the furrow wall and offset side thrust against the plow. Wheels of this type wear quickly and the narrow rim portion or skid ring gradually disappears. When the skid ring has worn away substantially the wheel is no longer effective to accomplish its purpose and where the skid ring is an integral part of the wheel the wheel is generally discarded. Thus a wheel of this type constitutes a relatively expensive item of plow equipment since it must be replaced in its entirety.

An object of the present invention is to provide a supporting wheel for an agricultural machine such as a plow which is characterized by economy and simplicity of manufacture.

Another object of the invention is to provide a novel wheel construction for a plow or the like having a replaceable skid ring.

Another object of the invention is to provide a replaceable skid ring for the furrow wheel of a plow or the like in which the skid ring is divided into sections for facilitating removal and replacement thereof.

A further object of the invention is to provide in a furrow wheel for a plow or the like a sectional skid ring having overlapping ends adapted to be readily mounted upon and held firmly in place upon the periphery of the furrow wheel.

Other objects and advantages of the invention will become clear from the following detailed description when read in conjunction with the accompanying drawings wherein:

Figure 1 is a plan view of a wheel embodying the features of the present invention;

Figure 2 is a section on the line 2—2 of Figure 1; and,

Figure 3 is a detail showing the means of attaching the skid ring to the rim of the wheel.

In the drawings numeral 10 indicates the hub portion of a wheel having radially extending spokes 11 and a tire or rim portion 12. As viewed in Figure 2 rim portion 12 has an inclined ground engaging periphery 13 and a rounded projecting portion 14.

The portion 14 of the furrow wheel rim is provided with a circumferential groove 15 and marginal recesses 16 are provided thereon at spaced locations to communicate with the groove 15. An annular skid ring 17 is provided for reception in the groove 15. Skid ring 17 is rectangular in cross section and is divided into two parts 18 and 19. Part 18 of the skid ring has an overhanging portion 20 at one end adapted to mate with under-lapping portion 21 of the skid ring portion 19, which in turn is provided with an overhanging portion 22 adapted to mate with an underlapping portion 23 of the skid ring element 18.

The skid ring 17 is provided at circumferentially spaced locations thereon with transverse openings 24, each of which is generally in the shape of a key hole having a widened portion 25 and a restricted portion 26. Openings 24 are spaced so that they are adapted to register with the marginal recesses 16 in the rim of the wheel.

The rim 12 of the wheel is provided with circumferentially spaced wedge shaped openings 27 extending radially through the wheel rim and tapering inwardly, said openings being in radial alignment with the marginal recesses 16. Each of the openings 27 is adapted to accommodate a radially extending L-head bolt 28 threaded to accommodate a nut 29. The head 30 of the bolt 28 is bent at right angles to the body thereof and is flanged at its ends for sliding reception in the opening 24 in the skid ring. The wedged shape of the opening 27 accommodates swinging movement of the bolt 28 to and from the marginal recesses 16 and into and out of registry with the opening 24 in the skid ring.

It will be noted that the skid ring sections 18 and 19 are provided with openings 24 at a location adjacent the overlapping parts 20 and 22, respectively. Thus, when the skid ring sections are assembled in the groove 15 one of the openings 24 of the skid ring is closely adjacent one of the bolts 28. When the skid ring sections are in place, each of the bolts 28 is swung toward the skid ring so that the head portion 30 of the bolt passes through the opening 24 in the skid ring. The bolt is then tightened by manipulating the nut 29 until the neck portion 31 of the bolt is fitted in the restricted portion 26 of the opening 24. In this position the head 30 of the bolt cannot be displaced from the opening in the skid ring. Likewise, due to the location of one of the bolts 28 adjacent the overhanging portions 20 and 22 respectively of the skid ring sections, the sections are held firmly in place and there is no opportunity for the free ends of the ring sections to become loose and distorted.

The skid ring 17 may, of course, be worn down to the rim of the wheel. However, when the ring has worn down to the rounded portion 14 of the rim, it is readily removed by loosening the bolts 28 and removing the sections 18 and 19 which may then be easily replaced by new sections. Thus the cost to the farmer of a wheel of this type for an agricultural machine is reduced to a minimum.

The application of the device of the present invention should be clearly understood from the foregoing description. If desired, of course, the skid ring 17 instead of being divided into two sections may be divided into three or even more.

Having described the invention, it may be noted that modifications may be made therein without departing from the spirit of the invention or the scope of the appended claims.

What is claimed is:

1. In a wheel, a rim having radial openings and a circumferential groove transversely spaced from the openings, a removable annular member comprising at least two segments adapted to fit within said groove, said annular member having transverse openings positionable adjacent the openings in the rim, and a latch member pivotally seated in each rim opening and having an angled portion adapted to be received in the adjacent opening in the annular member.

2. In a wheel, a rim having radial openings and a circumferential groove transversely spaced from the openings, a removable annular member comprising at least two segments adapted to fit within said groove, said annular member having transverse openings positionable adjacent the openings in the rim, a latch member pivotally seated in each rim opening and having an angled portion adapted to be received in the adjacent opening in the annular member, and adjustable means for locking the latch member in position to hold the annular member in said groove.

3. In a wheel, a rim having radial openings therein and a flange portion, said flange portion having a circumferential groove in its periphery and marginal recesses communicating therewith adjacent the respective openings, a removable annular member comprising at least two segments adapted to fit within said groove, said annular member having transverse openings adapted to register with the openings in the rim and with the recesses in said flange portion, and a bolt having its shank pivotally received in each opening in said rim for swinging movement transversely of the wheel and an angled portion adapted to be received in the adjacent opening in said annular member.

4. In a wheel, a rim having radial openings therein and a flange portion, said flange portion having a circumferential groove in its periphery and marginal recesses communicating therewith adjacent the respective openings, a removable annular member comprising at least two segments adapted to fit within said groove, said annular member having transverse openings adapted to register with the openings in the rim and with the recesses in said flange portion, a bolt having a threaded shank received in each opening in the rim for swinging movement therein and an angled portion adapted to be swung into position in the adjacent opening in said annular member to hold the latter in said groove, and a nut on the threaded end of the bolt for securing it in position.

5. In a wheel, a rim having a flange portion, said flange portion having a circumferential groove in its periphery and marginal recesses communicating therewith, a removable annular member comprising at least two segments adapted to fit within said groove, said annular member having transverse openings adapted to register with the recesses in said flange portion, a latch member pivoted with respect to the rim and having an angled portion, said latch member being swingable into and out of locking position with its angled portion received in one of the openings in said annular member, and means for securing said latch member in its locking position.

6. In a wheel, a rim having radial openings therein and a flange portion, said flange portion having a circumferential groove in its periphery and marginal recesses communicating therewith adjacent the respective openings, a removable annular member comprising at least two segments adapted to fit within said groove, said annular member having transverse openings adapted to register with the openings in the rim and with the recesses in said flange portion, and means operative to hold said segments against circumferential and radial displacement in said groove, comprising a plurality of locking members, each of said locking members having a threaded shank swingably received in one of the openings in the rim and an angled portion adapted to extend through one of said recesses into one of the openings in the annular member, and a nut on the end of the shank for securing the locking member in position.

7. In a wheel, a rim having radial openings therein and a flange portion, said flange portion having a circumferential groove in its periphery and marginal recesses communicating therewith adjacent the respective openings, a removable annular member comprising at least two segments adapted to fit within said groove, said annular member having transverse openings adapted to register with the openings in the rim and with the recesses in said flange portion and means operative to hold said segments against circumferential and radial displacement in said groove, comprising a plurality of L-head bolts, each of said bolts having a threaded shank pivotally received in one of the openings in the rim, the angled head of said bolt being adapted to extend through one of said recesses into one of the openings in said annular member, and a nut on the end of the shank for securing the bolt in position.

WAYNE G. TOLAND.

REFERENCES CITED

The following references are of record in the file of this patent:

UNITED STATES PATENTS

| Number | Name | Date |
| --- | --- | --- |
| 2,366,280 | Morkoski | Jan. 2, 1945 |